United States Patent [19]

Mukawa et al.

[11] Patent Number: 5,745,451
[45] Date of Patent: Apr. 28, 1998

[54] DISC RECORDING AND/OR REPRODUCING APPARATUS

[75] Inventors: Hiroshi Mukawa; Hirotoshi Fujisawa; Ryo Ando, all of Tokyo, Japan

[73] Assignee: Sony Corporation, Tokyo, Japan

[21] Appl. No.: 929,546

[22] Filed: Sep. 15, 1997

Related U.S. Application Data

[63] Continuation of Ser. No. 670,101, Jun. 25, 1996, abandoned, which is a continuation of Ser. No. 190,691, Feb. 2, 1994, abandoned, which is a continuation of Ser. No. 834,409, Feb. 12, 1992, abandoned.

[30] Foreign Application Priority Data

| Feb. 18, 1991 | [JP] | Japan | 3-044025 |
| Jul. 31, 1991 | [JP] | Japan | 3-214555 |

[51] Int. Cl.$^6$ .................................................. G11B 7/095
[52] U.S. Cl. .......................... 369/44.29; 369/58; 369/116
[58] Field of Search .......................... 369/58, 116, 48, 369/44.29, 44.35, 44.36, 77.2, 291, 54, 50; 360/69, 133

[56] References Cited

U.S. PATENT DOCUMENTS

| 4,554,599 | 11/1985 | Shiozaki | 360/69 |
| 4,932,016 | 6/1990 | Yoshida et al. | 369/48 |
| 4,995,029 | 2/1991 | Kobayashi et al. | 369/391 |
| 5,042,020 | 8/1991 | Endo | 369/116 X |
| 5,091,815 | 2/1992 | Suzuki | 360/133 |
| 5,091,901 | 2/1992 | Yamamoto et al. | 369/291 |
| 5,136,569 | 8/1992 | Fennema et al. | 369/58 |

FOREIGN PATENT DOCUMENTS

| 0 210 629 A3 | 2/1987 | European Pat. Off. |
| 0 271 997 A3 | 6/1988 | European Pat. Off. |
| 0 312 105 A3 | 4/1989 | European Pat. Off. |
| 0 391 588 A3 | 10/1990 | European Pat. Off. |

*Primary Examiner*—W. R. Young
*Attorney, Agent, or Firm*—Limbach & Limbach L.L.P.

[57] ABSTRACT

A disc recording and reproducing apparatus for use with a disc cartridge which includes an exterior indicator for indicating a reflectance of an optical disc housed in a cartridge body thereof, the disc recording and reproducing apparatus including a detector for detecting the exterior indicator and a setting control circuit for initially setting an output level of a laser light irradiated on the optical disc based on a detection output from the detector before beginning recording or reproducing operations.

3 Claims, 15 Drawing Sheets ical disc or a magneto-optical disc for re-recording information signals. More particularly, it relates to a disc cartridge in which a cartridge body including the optical disc accommodated therein is provided with discriminating means for indicating the type of the disc and a disc recording and/or reproducing apparatus for detecting the discriminating means provided in the cartridge body, discriminating the type of the optical disc accommodated in the disc cartridge depending on the detection output and for setting the recording and/or reproducing states in association with the thus detected different types of the optical disc.

DISC RECORDING AND/OR REPRODUCING APPARATUS

This is a continuation of application Ser. No. 08/670,101 filed on Jun. 25, 1996 of HIROSHI MUKAWA ET AL. for DISC RECORDING AND/OR REPRODUCING APPARATUS (as amended), now abandoned, which is a continuation application of application Ser. No. 08/190,691 filed on Feb. 2, 1994 of HIROSHI MUKAWA ET AL. for DISC RECORDING AND/OR REPRODUCING APPARATUS (as amended), now abandoned, which is a continuation application of application Ser. No. 07/834,409 filed on Feb. 12, 1992 of HIROSHI MUKAWA ET AL. for DISC CARTRIDGE AND DISC RECORDING AND/OR REPRODUCING APPARATUS, now abandoned.

BACKGROUND OF THE INVENTION

This invention relates to a disc cartridge including accommodated therein an optical disc, such as a read-only optical disc or a magneto-optical disc for re-recording information signals. More particularly, it relates to a disc cartridge in which a cartridge body including the optical disc accommodated therein is provided with discriminating means for indicating the type of the disc and a disc recording and/or reproducing apparatus for detecting the discriminating means provided in the cartridge body, discriminating the type of the optical disc accommodated in the disc cartridge depending on the detection output and for setting the recording and/or reproducing states in association with the thus detected different types of the optical disc.

DESCRIPTION OF THE RELATED ART

Optical discs have hitherto been proposed as a recording medium for musical signals or the like. These optical discs are classified into a read-only optical disc used only for reproducing pre-recorded information signals and a magneto-optical disc for overwriting or re-recording information signals after erasure of the information signals once recorded on the disc.

With the read-only optical disc, information signals are pre-recorded in a pattern of projections and recesses or pits on one major surface of a disc substrate formed of a light-transmitting synthetic resin, such as a polycarbonate resin. A light beam reflective layer of e.g. aluminum is applied to the major surface of the disc substrate carrying the pits. With the magneto-optical disc as an overwrite type optical disc, a signal recording layer of a magnetic thin film is provided on a major surface of the disc substrate formed of a light-transmitting material.

With each of the optical discs, the rim portion of a center hole is designed as a chucking region to be chucked by a disc rotating unit provided in a disc recording and/or reproducing apparatus for recording and/or reproducing information signals on or from the disc. Thus, with each optical disc, an outer peripheral region of the major surface of the disc exclusive of the inner peripheral chucking section is used as a signal recording region.

Meanwhile, for preventing deposition of dust and dirt and contact with hands or fingers of at least the signal recording region of the optical disc, the disc is arranged as a disc cartridge by being housed in a cartridge body which is composed of an upper cartridge half and a lower cartridge half abutted and connected to each other.

With the disc cartridge, the optical disc accommodated in the cartridge body is rotated in the cartridge body. A major surface of the cartridge body is formed with a chucking aperture for exposing the chucking region of the disc to the outside, and a signal recording/reproducing aperture for exposing at least a part of the signal recording region of the disc to the outside. Thus the optical disc has its chucking region chucked by the disc rotating unit of the disc recording and/or reproducing apparatus via the chucking aperture, while information signals are recorded or read on or from the signal recording region via the recording/reproducing aperture.

The information signals are read from the optical disc by the disc recording and/or reproducing apparatus by a light beam irradiated on the signal recording region. The light beam is radiated from an optical pickup device of the disc recording and/or reproducing apparatus so as to be converged on the signal recording region of the optical disc. The optical pickup device radiates the light beam and detects the return light reflected back from the signal recording layer of the optical disc.

On the other hand, information signals are written on the optical disc by the disc recording and/or reproducing apparatus by a light beam irradiated on the signal recording region of the disc and by a magnetic field applied to the signal recording layer. The magnetic field is applied to the signal recording region by a magnetic head provided in the disc recording and/or reproducing apparatus as an external magnetic field generator on the opposite side of the optical disc with respect to the optical pickup device.

Meanwhile, a disc recording and/or reproducing apparatus is proposed which may be used with both the read-only optical disc and the magneto-optical disc as recording medium. When a disc cartridge having the read-only optical disc accommodated therein is introduced into the disc recording and/or reproducing apparatus, the apparatus reads information signals pre-recorded in the signal recording region of the disc in the form of pits. On the other hand, when a disc cartridge having the magneto-optical disc is introduced into the disc recording and/or reproducing apparatus, the apparatus writes and reads information signals on or from the signal recording region of the disc.

In the disc recording and/or reproducing apparatus, which may be used with both the optical disc and the magneto-optical disc, it is necessary to change over an output of the light beam irradiated on the disc by the optical pickup device depending on the type of the disc, that is on whether the disc is an optical disc on which information signals may be recorded or a read-only optical disc.

The reason is that reflectance of the read-only optical disc, that is an optical disc on which Al is deposited, is as high as 80% or higher, whereas that of the overwrite type optical disc, such as magneto-optical disc, is significantly lower and of the order of 15 to 30%.

In addition, it is necessary with this disc recording and/or reproducing apparatus to change over the magnetic head between its operative and non-operative states depending on which of the optical discs is to be in use.

The optical pickup device and the magnetic head can be changed over by the user of the disc recording and/or reproducing apparatus by a manual switching operation. However, a mistaken changeover operation may give rise to destruction of the magnetic head or optical pickup device. Such mistaken operation also may give rise to inadvertent erasure of the recorded information signals. It is therefore necessary for the changeover operation in the disc recording and/or reproducing apparatus dependent on the disc type to be performed reliably without the possibility of mistaken operations.

It may be contemplated to render the size and/or the shape of the disc cartridge variable depending on the type of the optical disc. However, if the size and/or the shape of the disc should be selected freely, the disc recording and/or reproducing apparatus is necessarily complicated in structure.

It may also be contemplated to irradiate the optical disc with a predetermined amount of light and to detect the volume of light reflected from the optical disc to determine the disc type based on the difference in reflectance of the signal recording region of the optical disc. However, if reflectance of the signal recording region should be detected in the disc recording and/or reproducing apparatus, the disc recording and/or reproducing apparatus is again necessarily complicated in structure. On the other hand, with the method of detecting the volume of light reflected from the optical disc for determining the disc type, since the disc is once irradiated with a light beam and the disc type is determined on the basis of the return light from the optical disc, the disc type can not be determined promptly. That is, the disc type can be determined only after the disc recording and/or reproducing apparatus is driven into operation.

OBJECTS AND SUMMARY OF THE INVENTION

It is an object of the present invention to provide a disc cartridge in which the type of the optical disc accommodated therein may be determined easily and promptly.

It is another object of the present invention to provide a disc recording and/or reproducing apparatus which makes use of such a disc cartridge and which is not increased excessively in size or is not complex in structure.

It is a further object of the present invention to provide a disc recording and/or reproducing apparatus which makes use of the above disc cartridge and in which a changeover operation of the recording and/or reproducing modes thereof depending on the type of the disc accommodated within the disc cartridge may be effected correctly.

A disc recording and reproducing apparatus, and the method of its operation, for use with a disc cartridge which includes discriminating means for indicating a reflectance of an optical disc housed in a cartridge body thereof, for recording and reproducing information signals on or from the optical disc housed in the cartridge body. The apparatus comprises detecting means for detecting the discriminating means and setting means for setting an output level of a laser light irradiated on the optical disc based on a detection output from the detecting means. In the preferred embodiment, the optical disc has recorded table of contents data which indicates whether the optical disc is a recordable disc or a read-only disc, and further comprises means for reading the table of contents data with the laser light after the setting means has set the output level of the laser light and controlling, based on the read table-of-contents data of the optical disc, how the recording and reproducing apparatus records and reproduces the information signals.

Other objects and advantages of the present invention will become more apparent from the following description especially when read in conjunction with the accompanying drawings.

DETAILED DESCRIPTION OF THE PREFERRED EMBODIMENTS

Figure 1:
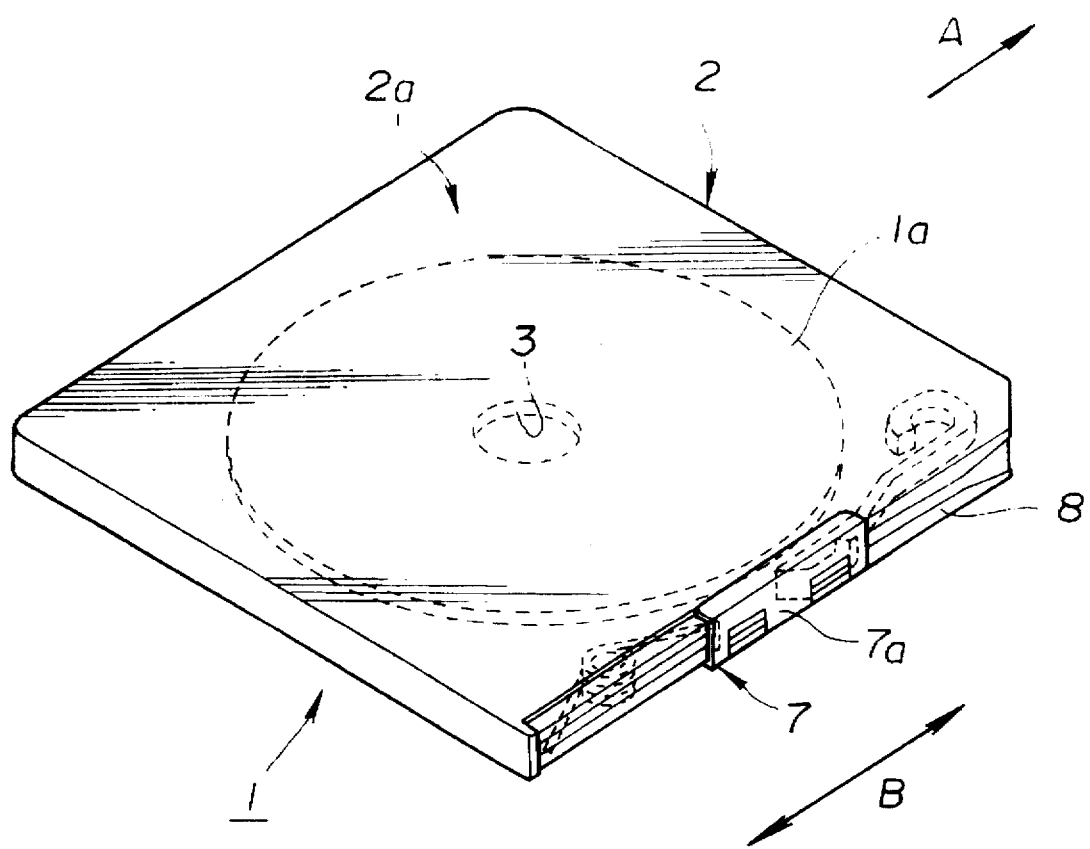
FIG. 1 is a perspective view, when seen from above, of a disc cartridge having accommodated therein a read-only optical disc, according to a first embodiment of the present invention.

Referring to the drawings, a first embodiment of the present invention will be explained in detail.

In the present first embodiment, a disc cartridge 1 has accommodated therein a so-called optical disc or a magneto-optical disc.

Referring to FIGS. 1 to 4, the disc cartridge 1 is comprised by a cartridge body 2 having an optical disc 1a accommodated therein, and a shutter member 7. The optical disc 1a is comprised by a disc-shaped disc base plate or a substrate, formed of a transparent synthetic resin, such as polycarbonate, and a signal recording layer deposited on a major surface of the disc substrate and made up of a thin metal film and a reflective film. The optical disc 1a is a so-called read-only optical disc and writing of information signals on the signal recording layer thereof is effected by transferring a pattern of projections and recesses, that is pits, from a stamper onto the disc substrate. An aluminum reflective layer is deposited on the major surface of the disc substrate provided with the pits such as by sputtering or evaporation.

With the optical disc, the rim part of the center hole functions as a chucking region to be chucked by a disc rotating unit of the disc recording and/or reproducing apparatus for recording and/or reproducing information signals on or from the disc. Thus, with the optical disc, the outer peripheral part of the major surface of the disc, exclusive of the inner peripheral chucking region thereof, functions as a signal recording region. A recording track in which predetermined information signals are recorded is formed helically so that the center of curvature of the helix is coincident with the center of the center hole.

The cartridge body 2 is formed as a thin rectangular casing made up of an upper cartridge half and a lower cartridge half abutted and connected to each other. That is, upper and lower major surfaces 2a, 2b of the cartridge body 2 facing the major surfaces of the optical disc 1a housed therein are each in the form of a square having each side slightly longer than the diameter of the optical disc 1a. The optical disc 1a is housed in the cartridge body 2 so that the major surface thereof provided with the signal recording region is faced by the lower major surface 2b and the other major surface thereof is faced by the upper major surface 2a.

The lower major surface 2b of the cartridge body 2 is provided with an aperture 5a for an optical pickup device, which aperture 5a is a substantially rectangular opening extended from a central region of the lower major surface 2b to close to a side of the lower major surface 2b, that is to close to a lateral side of the cartridge body 2. The aperture 5a for the optical pickup device exposes a part of the signal recording region of the major surface of the disc faced by the lower major surface 2b to the outside across the inner and outer peripheries of the optical disc 1a. In the operation of the disc recording and/or reproducing apparatus, information signals are read from the optical disc 1a by the optical pickup device via the aperture 5a for the optical pickup device. A substantially circular chucking aperture 6 is provided at a central part of the lower major surface 2b of the cartridge body 2. An inner peripheral side of the optical disc 1a, inclusive of the center hole 3, is exposed to the outside via the chucking aperture 6. With the disc recording and/or reproducing apparatus, a disc table of the disc rotating unit is intruded into the inside of the cartridge body 2 via the chucking aperture 6 so that the optical disc 1a is chucked by the disc chucking unit constituted by the disc table.

The cartridge body 2 is provided with a shutter member 7 for opening and closing the aperture 5a for the optical pickup device. The shutter member 7 is a one-piece member, such as a metal plate or a plate of synthetic resin, e.g. polyacetal, including a slide portion 7a supported by a lateral side of the cartridge body 2 and a lower plate portion 7b supported by the slide portion 7a. The slide portion 7a is in the form of an elongated bar having a thickness substantially corresponding to the thickness of the cartridge body 2. The lower late portion 7a is in the form of a rectangular plate larger in size than the aperture 5a for the optical pickup device for closing the aperture 5a, and is formed as one with the slide portion 7a by being integrally connected to the lower side of the slide portion 7a. The shutter member 7 has its slide portion 7a slidable relative to the cartridge body 2 so that the lower plate portion 7b may be slid with respect to the cartridge body 2 along the lower major surface 2b thereof. That is, the shutter member 7 may be moved with respect to the cartridge body 2 between a position of closing the aperture 5a and a position of opening the aperture 5a.

The lateral side of the cartridge body 2 associated with the slide portion 7a of the shutter member 7 is formed with a shutter opening groove 8 which is formed for extending along the direction of insertion of the disc cartridge into the disc recording and/or reproducing apparatus as indicated by an arrow A in FIGS. 1 to 4, that is, along the direction of movement of the shutter member 7 indicated by an arrow B in FIG. 1.

Figure 2:
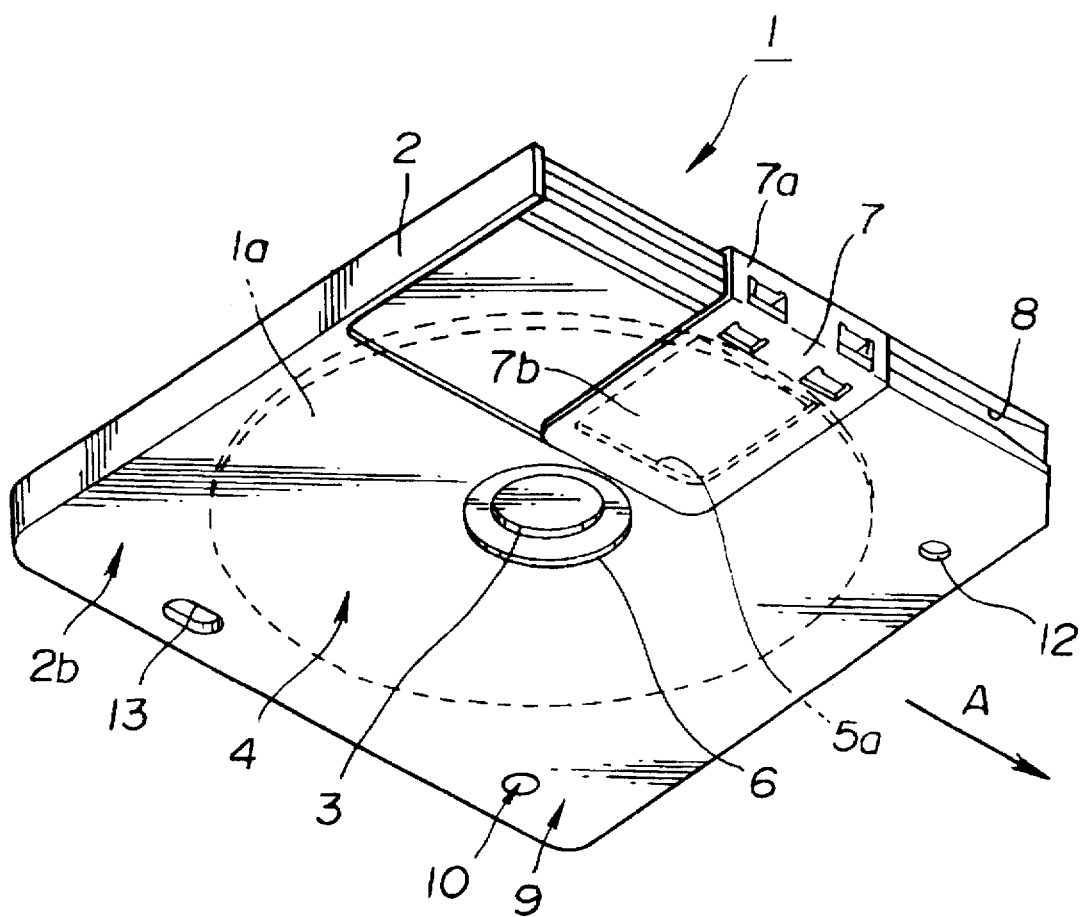
FIG. 2 is a perspective view, when seen from below, of the disc cartridge shown in FIG. 1.
Figure 3:
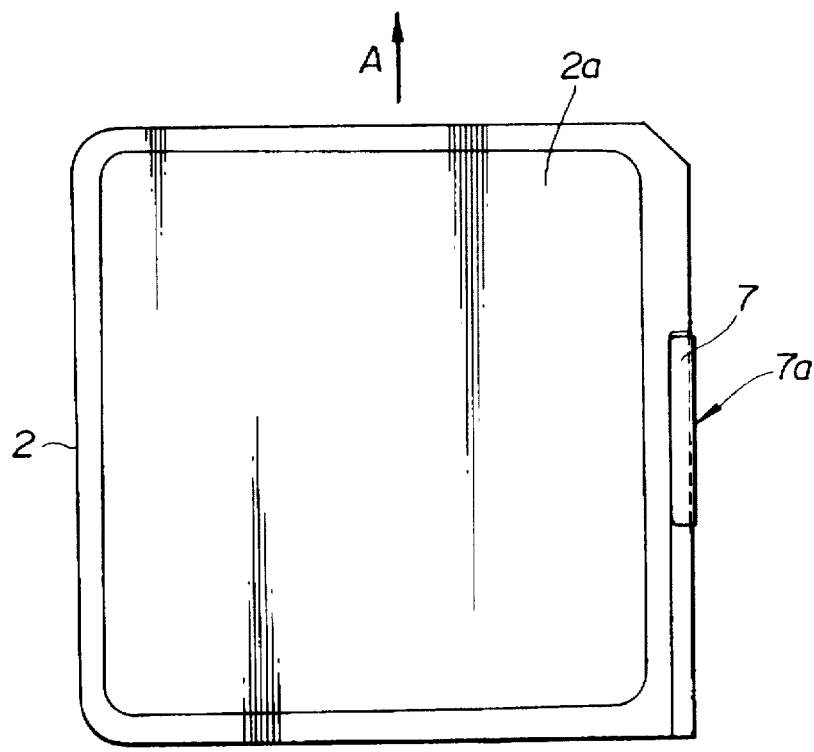
FIG. 3 is a plan view of the disc cartridge shown in FIG. 1.
Figure 4:
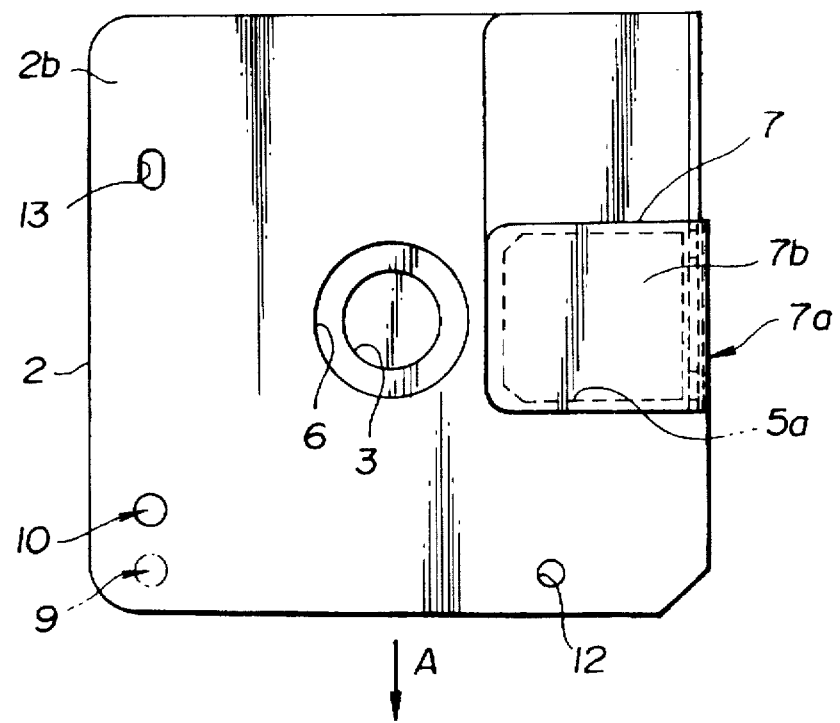
FIG. 4 is a bottom view of the disc cartridge shown in FIG. 1.
Figure 5:
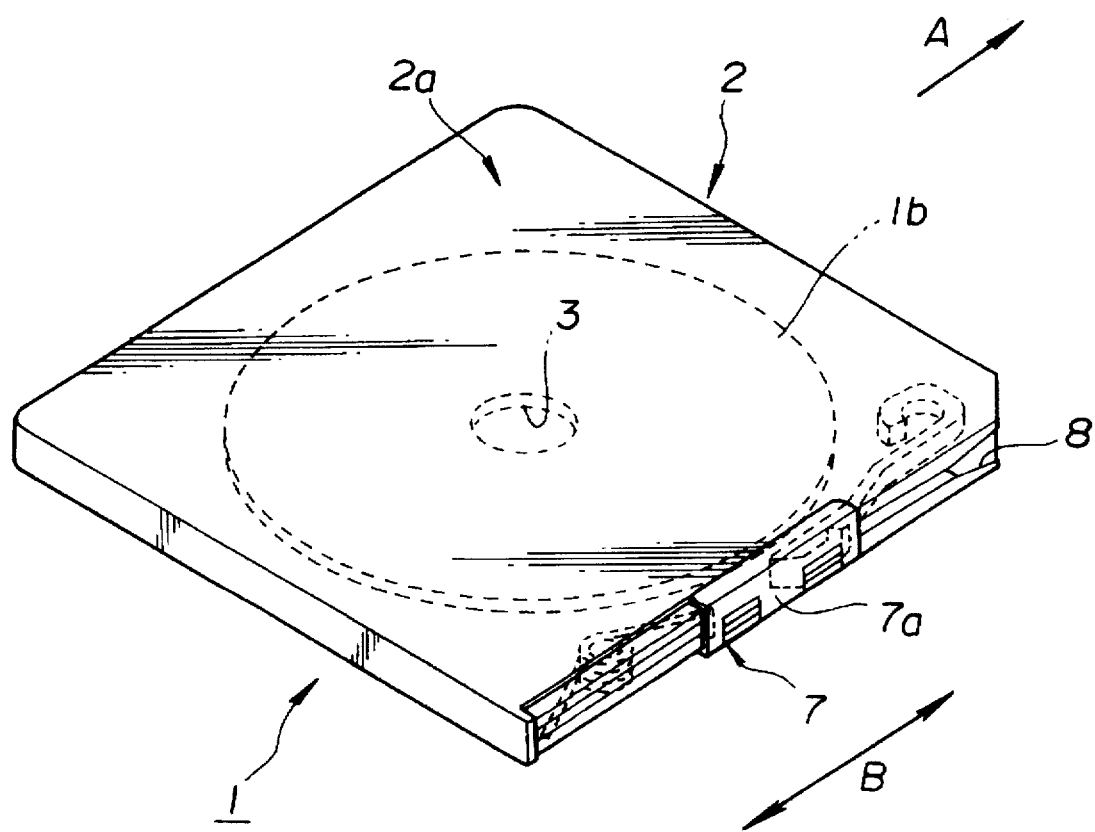
FIG. 5 is a perspective view showing the construction of a disc cartridge having accommodated therein a magneto-optical disc adapted for only reproducing information signals according to the present invention.
Figure 6:
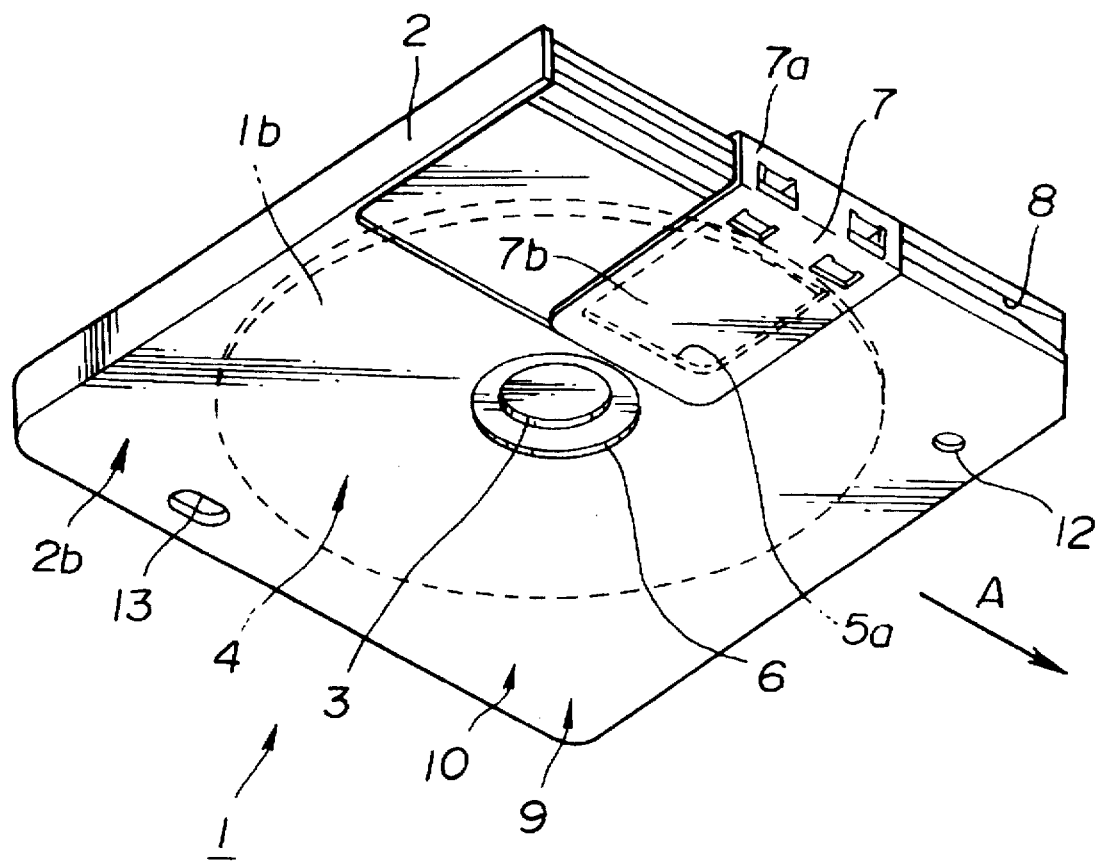
FIG. 6 is a perspective view, when seen from below, of the disc cartridge shown in FIG. 5.
Figure 7:
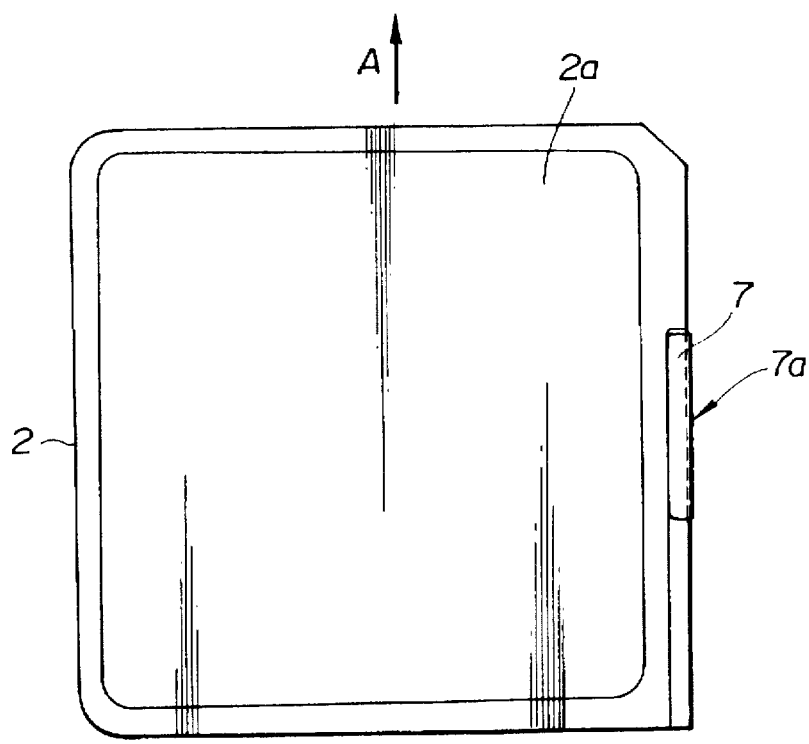
FIG. 7 is a plan view of the disc cartridge shown in FIG. 5.
Figure 8:
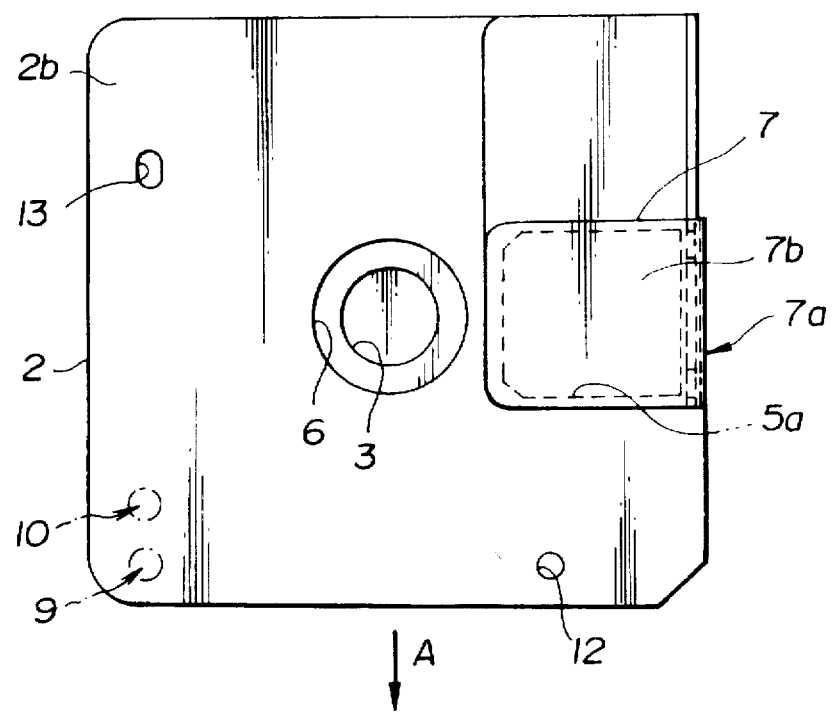
FIG. 8 is a bottom view of the disc cartridge shown in FIG. 5.
Figure 9:
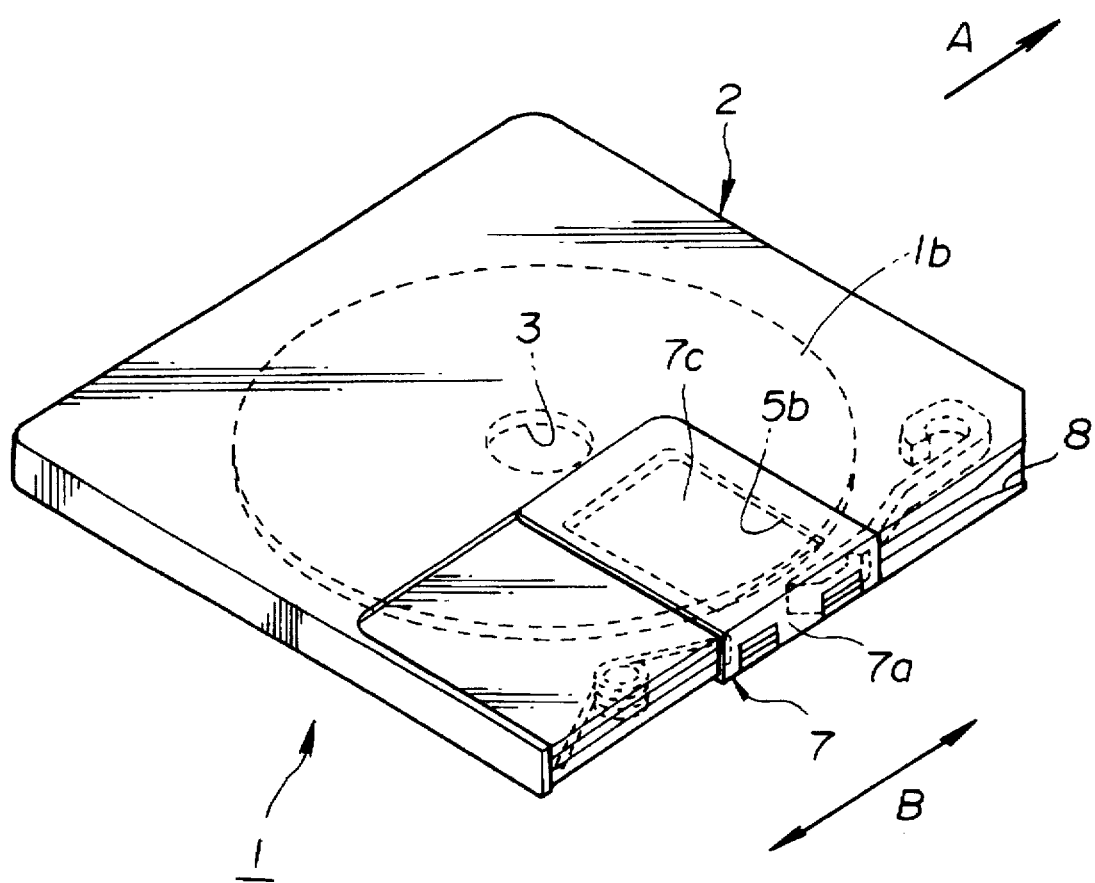
FIG. 9 is a perspective view showing the construction of a disc cartridge having accommodated therein a magneto-optical disc adapted for writing information signals according to the present invention.
Figure 10:
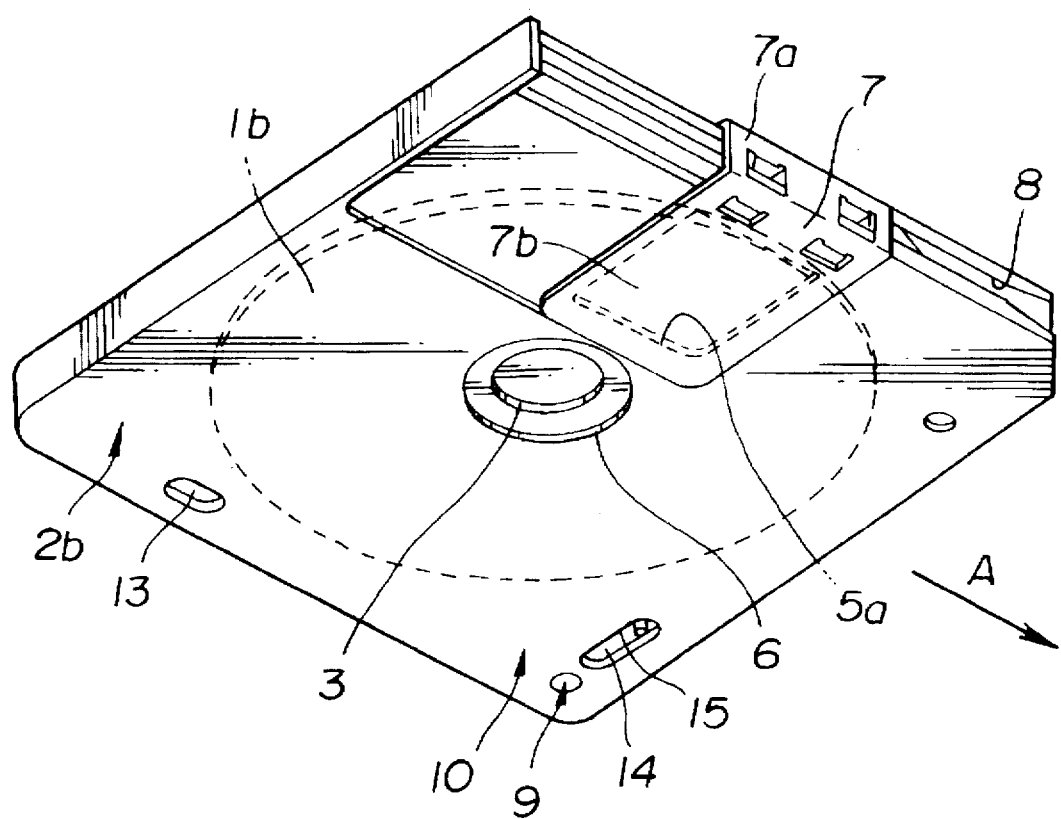
FIG. 10 is a perspective view, when seen from below, of the disc cartridge shown in FIG. 9.
Figure 11:
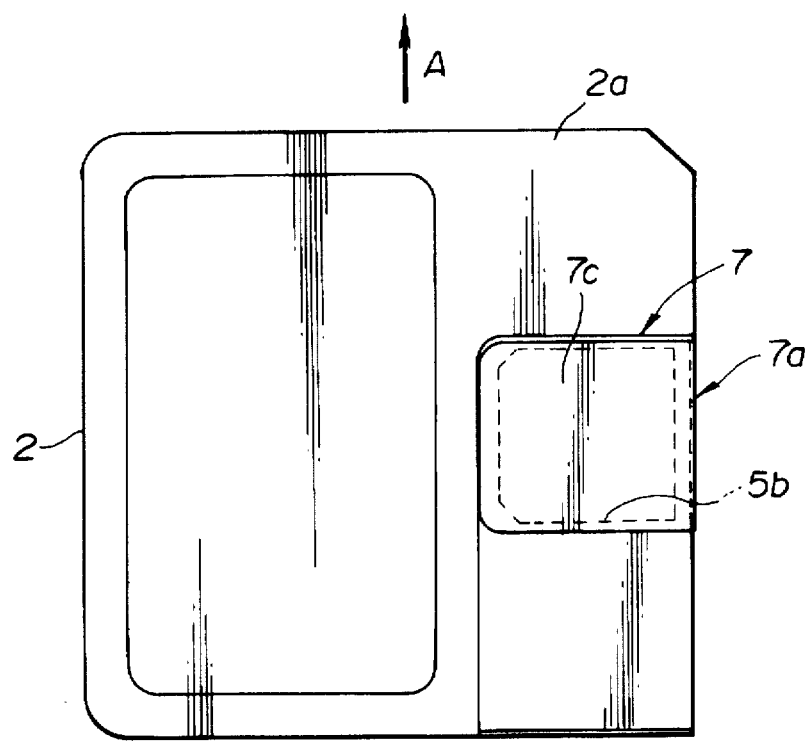
FIG. 11 is a plan view of the disc cartridge shown in FIG. 9.
Figure 12:
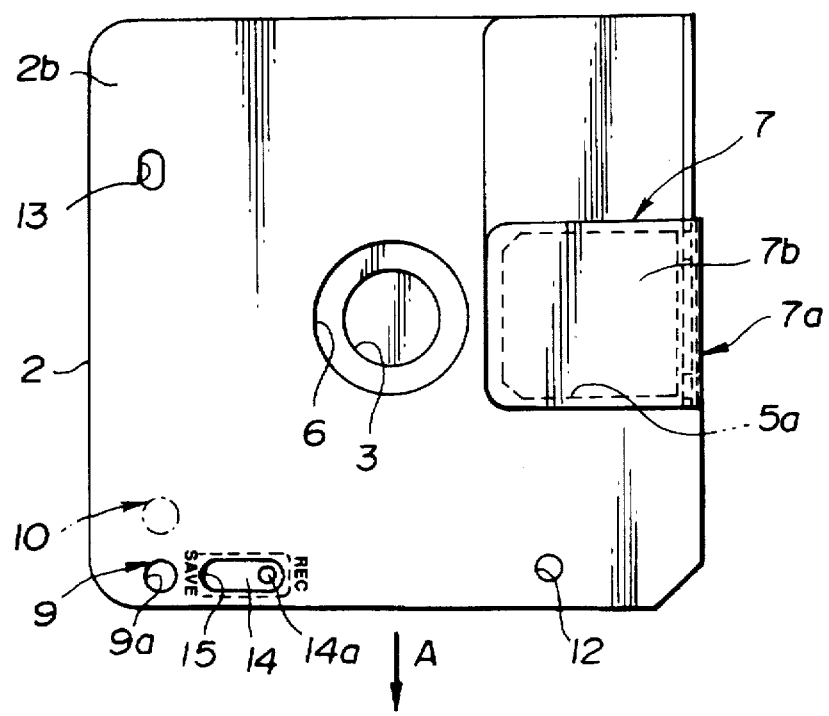
FIG. 12 is a bottom view of the disc cartridge shown in FIG. 9.
Figure 13:
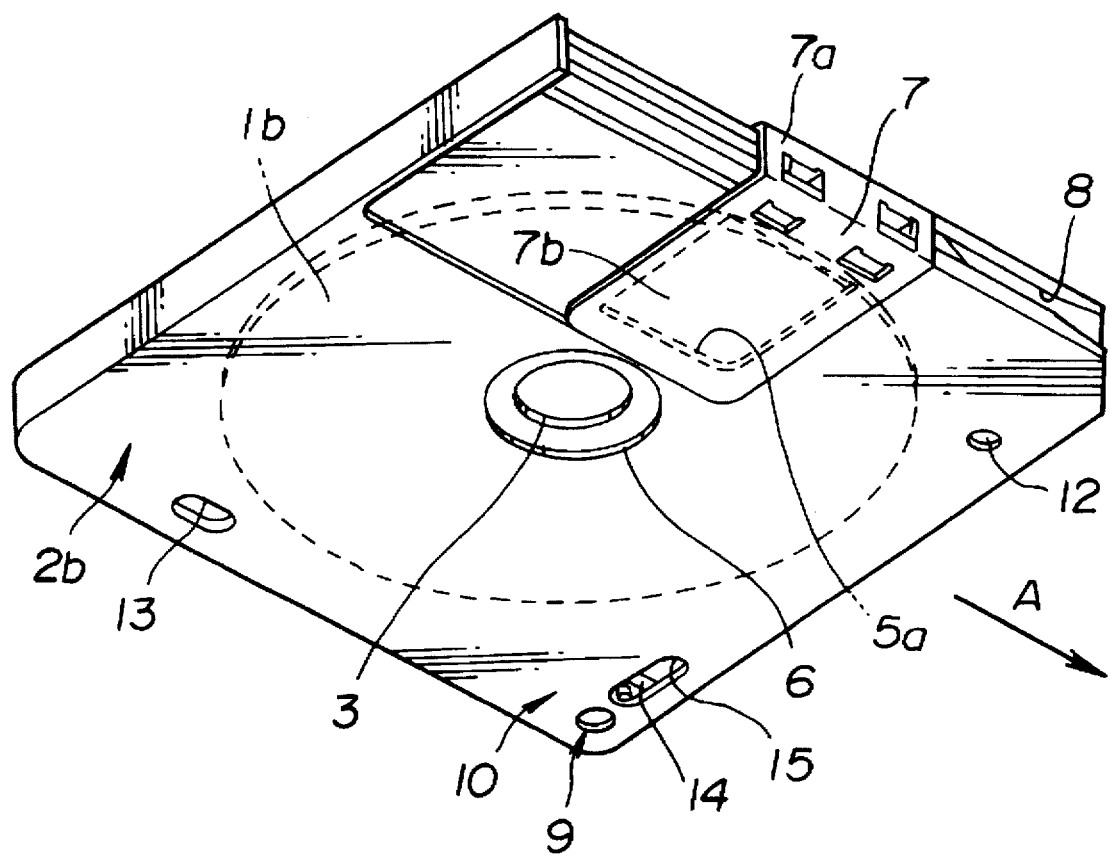
FIG. 13 is a perspective view, as seen from below, of the disc cartridge shown in FIG. 9, showing the state in which writing of information signals is inhibited.
Figure 14:
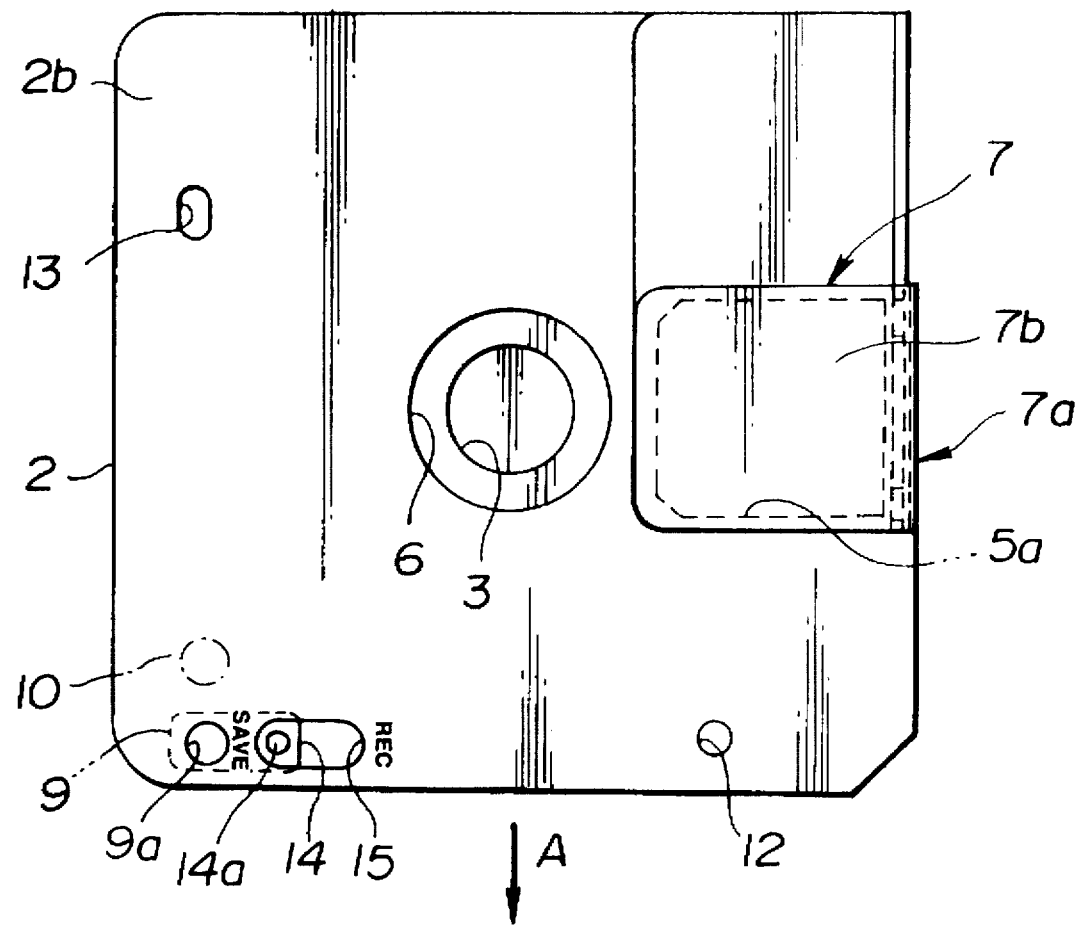
FIG. 14 is a bottom view of the disc cartridge shown in FIG. 9 showing the state in which writing of information signals is inhibited.
Figure 15:
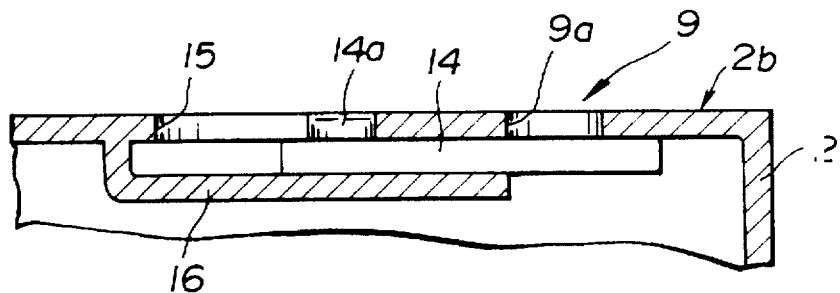
FIG. 15 is a partial longitudinal cross-sectional view showing the construction of a first disc type indicator of the disc cartridge shown in FIG. 9.

The lower major surface 2b of the cartridge body 2 is formed with first and second disc type indicators 9 and 10. As shown in FIGS. 2 and 4, these disc type indicators 9 and 10 are provided in juxtaposition along the direction of insertion of the disc cartridge, at a leading position as viewed in the direction of insertion, on a lateral side of the lower major surface 2b opposite to the lateral side thereof provided with the shutter opening groove 8.

With the disc cartridge 1, having the optical disc 1a housed therein, the first disc type indicator 9 is flush with the lower major surface 2b, while the second disc type indicator 10 is a recess having a predetermined depth. If, with the disc type indicators 9, 10, the flattened or flush state and the recessed state are represented by "1" and "0", respectively, the indicating states of the disc type indicators 9, 10 in the present disc cartridge 1 may be shown by "1, 0". This indicating state "1, 0" indicate that, since the optical disc 1a is a read-only optical disc and the signal recording layer of the disc 1a is a reflective layer of e.g. aluminum, the information signals can not be written on the optical disc 1a by the recording and/or reproducing apparatus.

With the disc cartridge of the present first embodiment of the present invention, the cartridge body 2 is loaded in a cartridge loading section within the disc recording and/or reproducing apparatus. At this time, the disc cartridge 1 is loaded in position within the cartridge loading section, with the cartridge body 2 thereof being set on distal ends of plural positioning pins provided on the cartridge loading section and with these positioning pins being engaged in first and second positioning holes 12, 13 provided in the lower major surface 2b.

When the disc cartridge 1 has been loaded in position in the cartridge loading section, the first and second disc type indicators 9, 10 are detected by means of, for example, first and second pushbutton switches, such as microswitches, as detection means, which are provided in association with the disc type indicators 9, 10 on a chassis, not shown, of the apparatus. That is, if the pushbutton switch is thrust by the cartridge body 2 when the disc cartridge 1 is loaded in position on the chassis, it is detected that the disc type indicator associated with the pushbutton switch is in a flattened state, that is, the indicating state is "1". If the pushbutton switch is not thrust by the cartridge body 2 when the disc cartridge 1 is loaded in position on the chassis, it is detected that the disc type indicator associated with the pushbutton switch is in a recessed state, that is, the indicating state is "0".

With the present disc recording and/or reproducing apparatus, when the disc cartridge 1 is loaded in position in the cartridge loading section by means of the positioning pins, the optical disc 1a accommodated in the disc cartridge 1 is set on the disc table attached to a rotating shaft of a spindle motor of the disc rotating unit. The disc table is in the form of a disc smaller in diameter than the chucking aperture 6 and larger in diameter than the center hole 3. When the cartridge body 2 is set in position with respect to the chassis, the disc table is intruded into the inside of the cartridge body 2 via the chucking aperture 6. The rim part of the center hole 3 in the major surface of the optical disc 1a is placed on the upper surface of the disc table intruded into the cartridge body 2. At this time, the optical disc 1a is spaced apart from the inner wall surface of the cartridge body 2. The shutter member 7 is slid, by the operation of a shutter member opening unit provided in the disc recording and/or reproducing apparatus, with respect to the cartridge body 2, for opening the aperture 5a for the optical pickup device. At this time, information signals may be read from the optical disc 1a via the aperture 5a for the optical pickup device.

With the disc recording and/or reproducing apparatus, the optical pickup device, movably supported with respect to the chassis, reads information signals from the optical disc 1a. The optical pickup device is faced by the signal recording region of the optical disc 1a and moved by transfer means, not shown, across inner and outer peripheries of the optical disc 1a. The optical pickup device irradiates the signal recording region of the disc 1a with a light beam for reading information signals from the signal recording region based on the light reflected from the signal recording region.

The operating states of the optical pickup device, that is the output of the light beam or the state of modulation, are set depending on the indicating states detected by the disc type indicators 9 and 10 and thus conform to the loaded disc 1a.

Referring to FIGS. 5 to 8, the disc cartridge 1, if used in conjunction with a read-only magneto-optical disc 1b, is made up of a cartridge body 2 in which the magneto-optical disc 1b is housed, and a shutter member 7.

The magneto-optical disc 1b is made up of a disc-shaped substrate, formed of a transparent synthetic resin, such as polycarbonate, and a signal recording layer, inclusive of a magnetic layer of a magnetic material, deposited on one of the major surfaces of the disc shaped substrate by evaporation or sputtering. Although the magneto-optical disc 1b may be designed for writing, erasing and reading information signals, it may also be made for only reading pre-recorded information signals, that is, it may be designed as a so-called read-only optical disc. It is assumed that the disc cartridge 1 of the present embodiment has housed therein such magneto-optical disc 1b designed as a read-only disc.

The magneto-optical disc 1b is provided with a center hole 3, as in the above optical disc 1a. A region of one of the major surfaces of the disc 1b, extending towards an outer rim from the inner peripheral chucking region inclusive of the center hole 3, is used as a signal recording region 4.

Similarly to the cartridge body 2 in the disc cartridge 1 associated with the read-only optical disc 1a, the cartridge body 2 includes an aperture 5a for the optical pickup device, a chucking aperture 6 and first and second disc type indicators 9, 10, the magneto-optical disc 1b housed therein, and a shutter member 7.

With the present disc cartridge 1, having housed therein the magneto-optical disc 1b, the first disc type indicator 9 is in a flattened state, that is, flush with the lower major surface 2b. The second disc type indicator 10 is similarly in the flattened state. That is, the indicating states of the disc type indicators 9, 10 of the disc cartridge 1 are denoted as "1, 1", which is associated with the read-only magneto-optical disc 1b in which the signal recording layer has the magnetic layer, and hence information signals can not be written on the disc 1b by the disc recording and/or reproducing apparatus.

When the present disc cartridge 1, associated with the read-only magneto-optical disc 1b, is used in the disc recording and/or reproducing apparatus, the cartridge body 2 thereof is loaded in position within the cartridge loading section. At this time, the indicating states by the first and second disc type indicators 9, 10 are detected, so that the operating states of the optical pickup device, for example, the power level of the light beam from the optical pickup device, is conformed to the magneto-optical disc 1b, on the basis of the indicating states as detected by the indicators 9, 10. With the present disc recording and/or reproducing apparatus, information signals are read from the magneto-optical disc 1b by the optical pickup device via the aperture for the optical pickup device 5a.

If a magneto-optical disc 1b suitable for both writing and reading data is used in conjunction with the disc cartridge 1, information signals may be written or read on or from the disc 1 by arranging the disc cartridge as shown in FIGS. 9 to 14. That is, information signals are not pre-recorded on the magneto-optical disc of the present disc cartridge, but information signals may be written, erased and read on or from the disc 1b. It is noted that control data necessary for writing the information signals, such as address data, are pre-recorded on the magneto-optical disc 1b.

The cartridge body 2 of the disc cartridge 1 includes an aperture 5a for the optical pickup device and a chucking aperture 6, similar to those of the cartridge body 2 of the disc cartridge 1 associated with the optical disc 1a, and first and second disc type indicators 9 and 10. The magneto-optical disc 1b is accommodated in the cartridge body 2. An aperture 5b for a magnetic head, similar in contour to the aperture for the optical pickup device 5a, is formed in the upper major surface 2a of the cartridge body 2. The aperture 5b for the magnetic head is in register with the aperture 5a for the optical pickup device with the magneto-optical disc 1b in-between.

A shutter member 7 is mounted on the cartridge body 2 for opening and closing the apertures 5a and 5b. Thus the shutter member 7 is provided with a slide portion 7a, a lower plate portion 7b, and an upper shutter portion 7c supported by the slide portion 7a, similarly to the lower portion 7b. The plate 7 is formed integrally from a metal plate or a sheet of synthetic resin, such as polyacetal resin, so as to present a U-shaped cross-sectional profile. The upper plate portion 7c is formed as a rectangular plate of a size larger than the aperture for the magnetic head 5b for closing the aperture for the magnetic head 5b. The upper plate portion 7c has a proximal side thereof supported by the lower side of the slide portion 7a and is faced by the lower plate portion 7b for extending parallel thereto. The shutter member 7 is mounted on the cartridge body 2 so that, when the shutter member 7 is slid with respect to the cartridge body 2, the plate portions 7b, 7c are moved between a position of closing the apertures 5a, 5b and a position of opening the apertures 5a, 5b.

With the present disc cartridge 1, associated with the magneto-optical disc 1b, the first disc type indicator 9 is recessed and has an opening 9a, whereas the second disc type indicator 10 is flattened. Thus the indicating state of the disc type indicators 9, 10 is shown as being "0, 1". The indicating state "0, 1" indicates that the disc is a magneto-optical disc 1b capable of reading and writing information signals, that is that the recording layer of the magneto-optical disc 1b is the magnetic film so that information signals may be written on the disc 1b by the disc recording and/or reproducing apparatus.

When the present disc cartridge 1, associated with the overwrite type magneto-optical disc 1b, is used in the disc recording and/or reproducing apparatus, the cartridge body 2 thereof is loaded in position within the cartridge loading section provided on the chassis.

At this time, the indicating states by the first and second disc type indicators 9, 10 are detected, so that the operating states of the optical pickup device is conformed to the magneto-optical disc 1b, on the basis of the indicating states as detected by the indicators 9, 10. If, after detection of the indicating states corresponding to that of the magneto-optical disc 1b, the recording mode or the erasure mode is set in the disc recording and/or reproducing apparatus, the magnetic head device, provided for facing the optical pickup device, may be rendered operative. In the recording and erasure modes, the magnetic head device is drawn close to the major surface of the magneto-optical disc 1b opposite to the major surface thereof provided with the information signals in the form of pits, via the aperture for the magnetic head 5b, for applying a magnetic field to the signal recording region.

With the present disc recording and/or reproducing apparatus, information signals are read from the magneto-optical disc 1b in the read mode by the optical pickup device via the aperture for the optical pickup device 5a, while information signals are recoded or erased on or from the magneto-optical disc 1b in the recording or erasure modes by the optical pickup device or by the magnetic head device.

With the present disc cartridge 1, the opening 9a of the first disc type indicator 9 may be opened or closed by an indication changing member 14 provided in the cartridge body 2, as shown in FIGS. 12 to 16.

Figure 16:
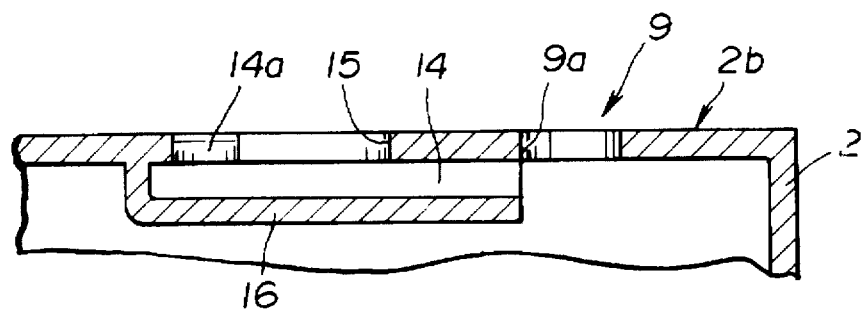
FIG. 16 is a partial longitudinal cross-sectional view showing the construction of the first disc type indicator of the disc cartridge shown in FIG. 9, showing the state in which an opening of the indicator is closed.

Referring to FIG. 16, the indication changing member 14 is formed as a substantially rectangular plate which is held between a supporting plate 16 provided within the cartridge body 2 and an outer wall of the cartridge body 2 so as to be slid in the longitudinal direction. The indication changing member 14 has its one end in register with a rim of the opening 9a of the first disc type indicator 9. The major surface of the indication changing member 14 is formed with a lug 14a for sliding the member 14. The lug 14a is exposed to the outside via an elongated opening 15 provided in the vicinity of the opening 9a. When the lug 14a is acted on by a user through the elongated opening 15, the indication changing member 14 is slid along the longitudinal direction of the elongated opening 15. When the indication changing member 14 is slid towards the opening 9a, it is moved at one end thereof over the opening 9a for closing the opening 9a.

If the opening 9a is closed by the indication changing member 14, the first disc type indicator 9 is substantially in the flattened state. The indicating state of the disc type indicators 9, 10 of the disc cartridge 1 is then "1, 1". This indicating state corresponds to that of the magneto-optical disc 1b which is a recoding-only disc, so that writing or erasure of the information signals on or from the magneto-optical disc 1b by the disc recording and/or reproducing apparatus can not be made. Thus, with the present disc recording and/or reproducing apparatus, information signals can only be read from the magneto-optical disc 1b by the optical pickup device, while writing and erasure of information signals on or from the magneto-optical disc 1b by the disc recording and/or reproducing apparatus is inhibited. That is, the magnetic head device of the disc recording and/or reproducing apparatus is in the non-operative state.

When the disc cartridge 1 is not loaded in the disc recording and/or reproducing apparatus, an indicating state is detected which is similar to that when the disc type indicators 9, 10 are both in the recessed states. The indicating state at this time is "0, 0", indicating that the disc cartridge 1 is not loaded in the disc recording and/or reproducing apparatus. At this time, both the optical pickup device and the magnetic head device are in the non-operative states.

Figure 17:
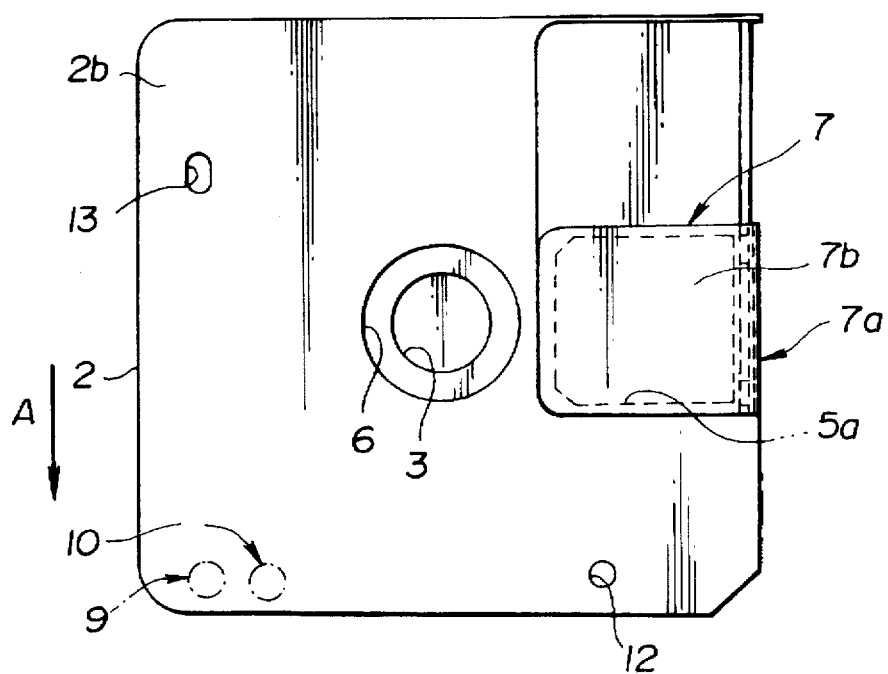
FIG. 17 is a bottom view showing a second embodiment of the disc cartridge according to the present invention.

The disc cartridge of the present invention is not limited to the arrangement of the preceding embodiments. For example, as in the disc cartridge according to a second embodiment shown in FIG. 17, the disc type indicators 9, 10 may be arrayed in a direction at right angles to the inserting direction on the lower major surface 2b of the cartridge body 2 at the forward end in the inserting direction. In this case, detection of the indicating states of the disc type indicators 9, 10 may be facilitated because these indicators may be detected in the course of insertion of the disc cartridge into the inside of the disc recording and/or reproducing apparatus.

The construction and operation of a disc recording and/or reproducing apparatus employing the disc cartridge of the present invention will be explained by referring to the drawings and in conjunction with a disc cartridge according to a third embodiment of the present invention.

Figure 18:
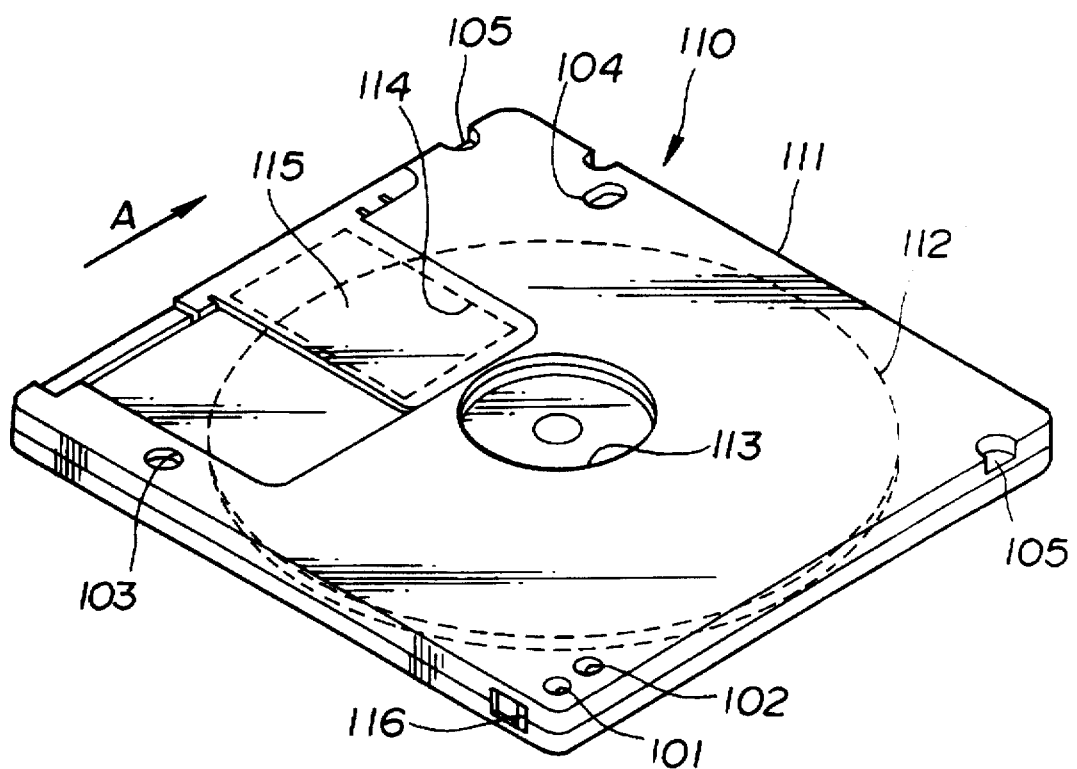
FIG. 18 is a perspective view of a disc cartridge according to a third embodiment of the present invention, shown in an inverted state.
Figure 19:
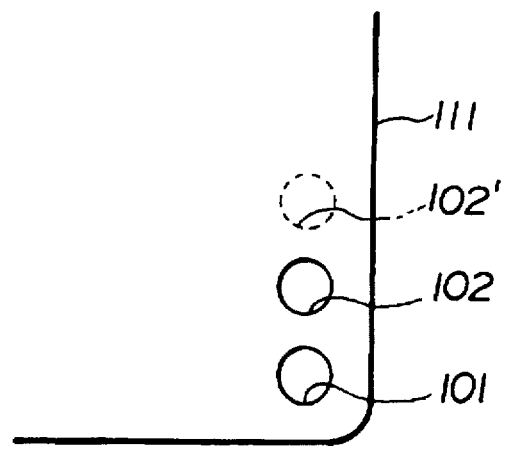
FIG. 19 is a plan view showing a critical portion of the disc cartridge shown in FIG. 18.

Referring to FIGS. 18 and 19, 110 denotes a disc cartridge of the third embodiment of the present invention. 111 denotes a cartridge body composed of an upper cartridge half and a lower cartridge half connected to each other. An optical disc 112 is rotatably accommodated in the cartridge body 111. The optical disc 112 may be any one of a recordable low-reflectance optical disc, such as the above mentioned magneto-optical disc, a read-only high-reflectance optical disc, provided with a highly reflective layer of e.g. aluminum on the disc substrate thereof, or a read-only low reflectance optical disc, provided with a reflective film of substantially the same reflectance as that of the low reflectance magneto-optical disc. A through-hole 113 is formed at the center of the bottom surface of the cartridge body 111. When the disc cartridge 110 is loaded in the disc recording and/or reproducing apparatus, a turntable is intruded via the through-hole so that the disc 112 is set on the disc table. The cartridge body 111 also is formed with an aperture 114 by means of which the optical pickup device of the disc recording and/or reproducing apparatus is faced by the signal recording region of the disc 112. The aperture 114 is normally closed by a shutter 115 and, when the disc cartridge 110 is intruded in the direction shown by an arrow A in FIG. 18, so as to be loaded in position within the disc recording and/or reproducing apparatus, the shutter 115 is slid for opening the aperture 114. 103, 104 denote positioning holes. In the present embodiment, the holes 103, 104 are circular and oblong, respectively. 105 denotes a notch for engagement by a loading unit on intrusion of the disc cartridge into the disc recording and/or reproducing apparatus. When the disc cartridge 110 is loaded in the disc recording and/or reproducing apparatus, the shutter 15 is opened by shutter opening means provided in the disc recording and/or reproducing apparatus, at the same time that the positioning holes 103, 104b are engaged by positioning pins provided in the apparatus for setting the loading position of the disc cartridge 110.

The above described disc cartridge 110 is provided with several discriminating means at rear corners of the bottom of the cartridge body 111. 101 denotes a discriminating hole for preventing inadvertent erasure. A detection unit, not shown, provided in the disc recording and/or reproducing apparatus, detects whether the discriminating hole 101 is opened or closed to determine whether or not recording is feasible. 116 denotes a knob of a slider, not shown, for opening or closing the hole 101.

A discriminating hole 102 indicating the reflectance of the optical disc 112 accommodated within the cartridge body 111 is formed in the cartridge body 111 adjacent to the discriminating hole 101 for inhibiting inadvertent erasure. The discriminating hole 102 is opened and closed when the disc accommodated within the cartridge body 111 is of low reflectance, respectively, or high reflectance or vice versa. This is detected by the disc recording and/or reproducing apparatus for correspondingly adjusting the level of the laser power irradiated by the optical pickup device on the optical disc.

Figure 20:
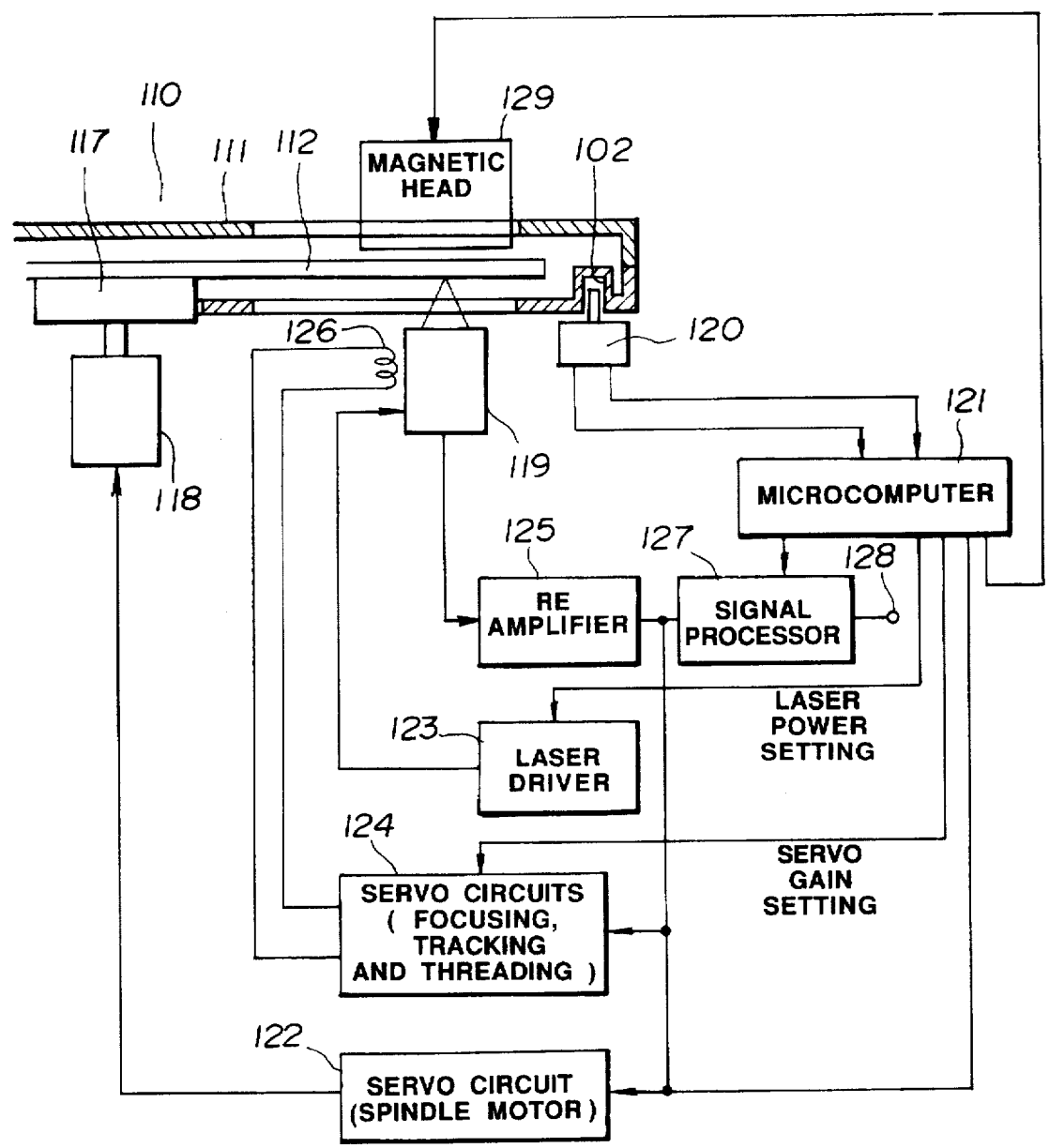
FIG. 20 is a block diagram showing the construction of a system for detecting a discrimination hole in the disc cartridge for setting a laser power.

FIG. 20 shows, in a block diagram, a system for detecting the discriminating hole 102 of the disc cartridge 110 of the disc recording and/or reproducing apparatus for setting the laser power as a function of reflectance of the optical disc 112. In FIG. 20, 117 denotes a turntable for setting the optical disc 112 within the disc cartridge 110, 118 a spindle motor for rotationally driving the turntable 117, and 119 an optical pickup device for irradiating the signal recording region of the optical disc 112 with a laser beam for writing or reading information signals. A detection switch 120 is provided in association with the discriminating hole 102 of the disc cartridge 110. The detection switch 120 is not thrust and hence is turned off when the discriminating hole 202 is opened, while the detection switch 120 is thrust and turned on when the discriminating hole 102 is closed, so that the output level of the laser power may be changed correspondingly.

In the present system, when the disc cartridge 110 is loaded in the disc recording and/or reproducing apparatus, and the disc 112 is set on the turntable 117, commands of a microcomputer 121 are transmitted to a servo circuit 122 for driving the spindle motor 118 for rotationally driving the optical disc 112. Simultaneously, the detection switch 120 detects whether the discriminating hole 102 of the disc cartridge 110 is opened or closed and, depending on an output from the detection switch 120, the microcomputer 121 proceeds to determining if the optical disc 112 within the disc cartridge 110 is of low reflectance or high reflectance. The microcomputer 121 accordingly sets the light beam from the optical pickup device to an optimum output level to transmit a corresponding driving signal to a laser driving circuit 123 so that a laser light having an output corresponding to reflectance of the optical disc 112 is irradiated on the disc by the optical pickup device 119. Simultaneously, the microcomputer 121 sets a servo gain proportionate to reflectance of the disc 112 to transmit a corresponding signal to a servo circuit 124 so that focusing and tracking servo control operations as well as the reading servo operation is effected satisfactorily by a driving coil 126 of the optical pickup device 119 for reading signals from the optical disc 112. On the other hand, RF signals read by the optical pickup device 119 are supplied via an RF amplifier 125 to servo control circuits 122, 124 so that the focusing, tracking and threading servo operations are effected continuously on the basis of these RF signals by the spindle motor 118 and the optical pickup device 119. A part of an output from the RF amplifier 125 is transmitted to a signal processor 127 for decoding or like processing operations before being outputted at an output terminal 128. 129 denotes a magnetic head as an external magnetic field generator which has its operation controlled by control signals from the microcomputer 121, as will be explained subsequently.

Since only one discriminating hole 102 indicating disc reflectance is provided in the above embodiment, it is only possible to discriminate a disc of high reflectance and a disc of low reflectance from each other. If the different optical discs exhibit three to four different values of reflectance, a second discriminating hole 102' may be provided, as indicated by a broken line in FIG. 19. In this case, four different values of reflectance $R_1$ to $R_4$ may be discriminated from one another, as shown in Table 1, by the combination of the opened and closed states of the discriminating holes 102 and 102'.

TABLE 1

| DISCRIMINATING HOLE 2 | DISCRIMINATING HOLE 2' | REFLECTANCE |
| --- | --- | --- |
| OPENED | OPENED | $R_1$ |
| OPENED | CLOSED | $R_2$ |
| CLOSED | OPENED | $R_3$ |
| CLOSED | CLOSED | $R_4$ |

As specific example, the presence or absence of the disc cartridge may be discriminated by setting reflectance $R_1$ to approximately 0%.

By detecting the discriminating hole(s) of the disc cartridge and hence the disc reflectance and correspondingly setting the laser power and the servo gain of the optical pickup device, the information signals recorded on the optical disc may be read reliably.

When reading information signals recorded on the optical disc, the thread motor is driven by control signals from the microcomputer 121 from an inner periphery of the optical disc. Table-of-contents data (TOC data) are recorded in the inner peripheral region radially inwardly of the signal recording region. The optical pickup device reads out the TOC data with a laser power as set by detecting the discriminating hole. The TOC data include various data concerning the optical disc. That is, by the optical pickup reading the TOC data, the microcomputer 121 proceeds to determine the disc type, that is whether the disc is of the recordable type or of the read-only type, and the recording format, such as signal format. Then, depending on the type of the optical disc, the signal processing operation performed by the signal processor 127 or the driving control state of the magnetic head is changed over for performing the recording and/or reproducing operations.

Figure 21:
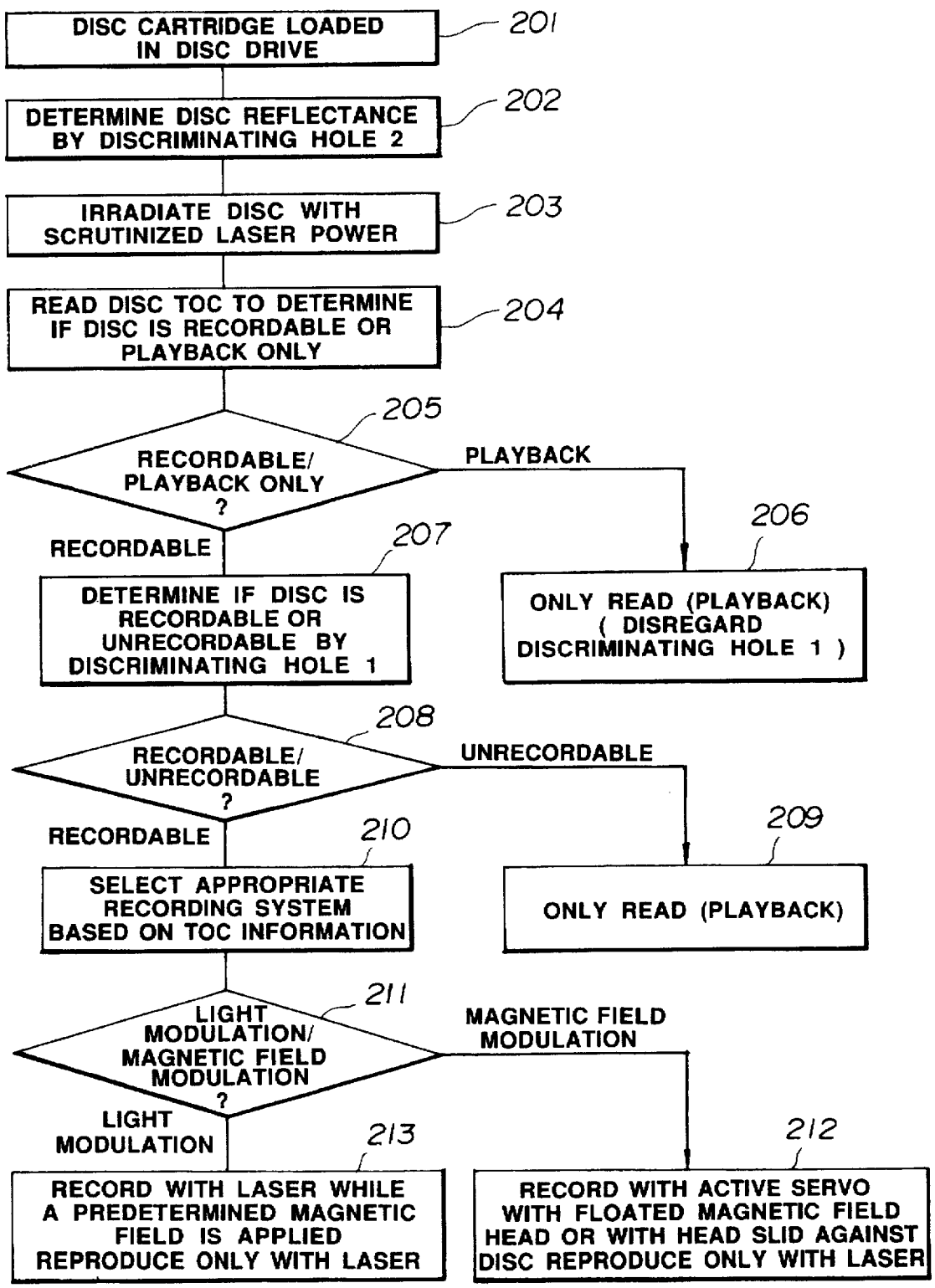
FIG. 21 is a block diagram for illustrating the operation of discriminating the disc type and recording and/or reproducing information signals.

FIG. 21 shows the sequence of the above operations by a flow sheet. When the disc cartridge 110 is first loaded at step 201 in the disc recording and/or reproducing apparatus, the discriminating holes 102, 102' are detected at step 202 for discriminating disc reflectance. The laser power of a laser from an optical pickup device 119 is set in accordance with the results of step 202 for irradiating the disc at step 203.

The TOC data of the optical disc is read to determine if the disc is a recordable disc or a read-only disc and the signal format type at step 204. If the disc is a read-only disc, the reading operation (playback) is performed at step 206. At this time, the presence of the discriminating hole for inhibiting inadvertent erasure 101 is disregarded.

If the results of discrimination indicate that the disc is of the recordable type, the discriminating hole 101 of the disc cartridge 110 is detected for determining whether the optical disc 112 is in the recordable state or in the unrecordable state, that is, in the inadvertent erasure inhibiting state (steps 207, 208). If the optical disc 112 is in the unrecordable state, only the reading operation (playback) is performed (step 209).

If the optical disc 112 is recordable, the recording system appropriate for the optical disc 112 is selected (step 210). That is, if the magneto-optical disc is used as a recordable disc, the recording system is one of the light modulating recording system and the magnetic field modulation recording system.

If the recording system is the magnetic field modulation recording system, a magnetic field head 129, as an external magnetic field generator for generating a recording modulating magnetic field, is floated with respect to the magneto-optical disc, while a light beam of the recording power level is irradiated on the disc by the optical pickup device, at the same time that an active servo is applied for controlling the magnetic field head 129 for removing the magnetic field head a predetermined distance from the magneto-optical disc, or the magnetic field head 129 is brought into sliding contact with the magneto-optical disc for writing information signals on the magneto-optical disc. Information reading from the optical disc is by only the light beam from the optical pickup device (step 212). In the case of the light modulation system, the light beam from the optical pickup device is controlled to be turned on and off based on information signals to be recorded, while the unidirectional magnetic field is applied from the magnetic field head as the external magnetic field generator, for writing information signals on the optical disc. On the other hand, information reading from the optical disc is by only the optical pickup, as in the case of the magnetic field modulating system (step 213).

It will be seen from above that, with the present method, determination of basic items, that is discrimination of recordability or non-recordability (inhibition of inadvertent erasure) of the disc is taken charge of by the corresponding discriminating holes provided in the disc cartridge, while discrimination of other items is based on the results of reading of the TOC information of the optical disc.

It is possible in this manner to cope with an increased number of the disc types. That is, presently proposed disc types include a low reflectance recordable disc (magneto-optical disc), a high reflectance read-only disc (disc with an evaporated aluminum layer) and a low reflectance read-only disc. It is also probable that a high reflectance recordable disc will make its debut, while it is necessary to discriminate between a low durability disc and a high durability disc in the case of the disc slidingly contacted by the recording magnetic field head. Besides, what type of the disc will make its debut in future is beyond estimation.

A number of discrimination holes would be necessitated if discrimination of these items be taken charge of by corresponding discriminating holes. This is not desirable in consideration of the limited space available on the disc cartridge. If the discrimination of the basic items, such as disc reflectance, be dealt with by the discriminating holes of the disc cartridge, and the remaining items be dealt with by the TOC data of the disc, for discriminating the disc types, it becomes possible to cope easily with any disc type.

With the above described disc cartridge according to each embodiment of the present invention, the first and second disc type indicators, provided on outer surfaces of the cartridge body having the disc rotatably accommodated therein, are in the open or closed states, and indicate one of the four indicating states in unison.

In this manner, with the present disc cartridge, by detecting the indicating states, associated with the disc types, of the disc type indicators, the disc type may be discriminated easily. Detection of the disc type indicators may be achieved easily by microswitches or the like.

Thus the present invention provides a disc cartridge which will allow the type of the disc accommodated in the cartridge body thereof to be discriminated easily and which will permit a disc recording and/or reproducing apparatus to perform predetermined switching operations reliably as a function of disc types without complicating or enlarging the size of the disc recording and/or reproducing apparatus.

The present invention also provides an arrangement in which discriminating means for indicating reflectance of the optical disc is provided in a portion of a cartridge body having the optical disc accommodated therein, and in which the disc recording and/or reproducing apparatus is provided with means for detecting the discriminating means and means for setting the power of a laser light irradiated on the optical disc as a function of an output of the detection means, so that reflectance of the optical disc may be determined automatically and the laser power may be set in conformity to the discriminated reflectance for reliably reading the signals recorded on the optical disc. If reflectance of the optical disc is first discriminated by the discriminating means of the disc cartridge as described above and the TOC information recorded on the optical disc is read for discriminating the type of the optical disc, in accordance with the present invention, any disc type may be coped with easily.

What is claimed is:

1. An optical disc recording and/or reproducing apparatus for recording or reproducing a plurality of reflectivity deferent type of optical discs having a data recording area for recording data and a contents data area for recording contents data of the recording area, said apparatus comprising:

a disc cartridge including a cartridge body for housing one of said optical discs and a first discriminating portion formed on said cartridge body, said first discriminating portion for indicating the reflectivity of one of the optical discs housed in said cartridge body by a plurality of unevenness;

recording and/or reproducing means for recording or reproducing to or from the optical disc housed in said disc cartridge and having an optical pickup for irradiating a light beam to the optical disc housed in said disc cartridge;

a detecting switch mechanically contacted to said first discriminating portion of said disc cartridge loaded on said apparatus;

servo means for controlling the focus and the position of the light beam radiated from said optical pickup on the optical disc housed in said disc cartridge; and a controller for supplying the output signal from said detecting switch and for discriminating the reflectivity of the optical disc housed in said disc cartridge, said controller for controlling the output level of the light beam emitted from said optical pickup according to the discriminating result and for setting the gain of said servo means according to the discriminating result before recording or reproduction to or from the optical disc housed in said disc cartridge;

wherein said recording and/or reproducing means reads out contents data of the optical disc housed in said disc cartridge by said optical pickup after completing the control operation of the light beam emitted from said optical pickup and the setting operation of the gain of said servo means; and wherein said controller discriminates the type of the optical disc housed in said disc cartridge according to the read-out contents data and controls said recording and/or reproducing means according to the discriminating result of the contents data of the optical disc housed in said disc cartridge.

2. An optical disc recording and/or reproducing apparatus according to claim 1, wherein said disc cartridge further comprises a second discriminating portion for indicating a recording condition of the optical disc housed in said disc cartridge, said second discriminating portion detected by said detecting switch, the detecting switch providing the output signal as the detection result of said second discriminating portion to the controller and the controller controlling the recording operation of said recording and/or reproducing means after reading the contents data from the optical disc housed in said disc cartridge.

3. A control method for controlling an optical disc recording and/or reproducing apparatus in recording or reproducing a plurality of reflectivity deferent type of optical discs having a data recording area for recording data and a contents data area for recording contents data of the recording area and housed in a disc cartridge having a cartridge body for housing one of said optical discs and a discriminating portion formed on the said cartridge body, said discriminating portion indicating the reflectivity of one of the optical discs housed in said cartridge body by a plurality of unevenness, said apparatus including a recording and/or reproducing means, a detecting switch and servo means, said recording and/or reproducing means for recording or reproducing the optical disc housed in said disc cartridge and having an optical pickup for irradiating a light beam to the optical disc housed in said disc cartridge, said detecting switch mechanically contacted to said discriminating portion of said disc cartridge loaded on said apparatus, said servo means for controlling the focus and the position of the light beam radiated from said optical pickup on the optical disc housed in said disc cartridge, said method comprising steps of:

detecting a discriminating portion of a disc cartridge loaded on a recording and/or reproducing apparatus by a detecting switch;

discriminating the reflectivity of an optical disc housed in said disc cartridge;

controlling the output level of a light beam emitted from an optical pickup according to the discriminating result;

setting the gain of a servo means according to the discriminating result before recording or reproduction to or from the optical disc housed in said disc cartridge;

reading out the contents data of the optical disc housed in said disc cartridge by said optical pickup after completing the control operation of the light beam emitted from said optical pickup and the setting operation of the gain of said servo means;

discriminating the type of the optical disc housed in said disc cartridge according to the read out contents data; and controlling a recording and/or reproducing means according to the discriminating result of the contents data of the optical disc housed in said disc cartridge.

* * * * *